3,218,358
PHOSPHORUS-CONTAINING HETEROCYCLES
AND METHODS FOR PREPARING SAME
Richard Parke Welcher, Old Greenwich, Conn., assignor to American Cyanamid Company, New York, N.Y., a corporation of Maine
No Drawing. Filed Dec. 22, 1961, Ser. No. 161,406
9 Claims. (Cl. 260—606.5)

The present invention relates to organophosphorus compounds and methods for preparing same. More particularly, the instant discovery concerns 4-phosphorinanes

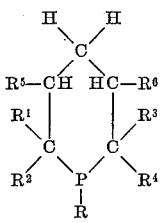

prepared by reducing 4-phosphorinanones of the formula

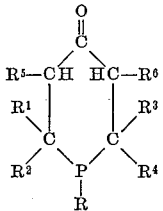

R in the above formulae represents a member selected from the group consisting of substituted and unsubstituted, branched and straight chain alkyl ($C_1$-$C_{18}$), substituted and unsubstituted cycloalkyl, substituted and unsubstituted aryl; $R^1$, $R^2$, $R^3$ and $R^4$ each represent a member selected from the group consisting of hydrogen, lower alkyl, phenyl, lower alkyl-substituted phenyl, cyclohexyl and lower alkoxyalkyl; and $R^5$ and $R^6$ each represent a member selected from the group consisting of hydrogen, lower alkyl, and phenyl.

The 4-phosphorinanone reactants are prepared according to copending U.S. application, Serial No. 161,405, filed on December 22, 1961, simultaneously herewith, refiled on February 18, 1965, as continuation-in-part application Serial No. 433,768, the parent application being now abandoned, by reacting a primary phosphine $RPH_2$ with a divinyl ketone (1,4-dien-3-one) of the formula

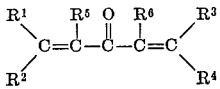

and recovering the corresponding phosphorinanone.

The primary phosphine reactant and the 1,4-dien-3-one reactant are best reacted at a temperature in the range of 80° C. to 200° C. and recovering the resulting 4-phosphorinanone product by volatilization, for example, at a reduced pressure in the range of 0 to 760 millimeters. Reaction is best carried out in a substantially inert atmosphere, such as in a nitrogen or helium atmosphere, or the like. No catalyst or solvent is necessary for the process contemplated herein.

Furthermore, the process is generally carried out at atmospheric pressure. Superatmospheric pressures as high as 700 pounds per square inch may likewise be used, particularly with low boiling reactants. Usually, however, very good results are achieved at atmospheric pressure.

Similarly, stoichiometric quantities of the reactants are generally employed. Nevertheless, small excesses of either reactant may be present without detrimentally affecting the nature of the reaction.

Generally, the reactants are heated for at least one hour, but this is not critical since incipient reaction occurs upon intermingling the reactants.

Typical primary phosphines useful for producing 4-phosphorinanone reactants within the purview of the instant discovery are phenylphosphine, cyclohexylphosphine, dodecylphosphine, isopropylphosphine, benzylphosphine, 2-ethoxyethylphosphine, 2-cyanoethylphosphine, para-chlorophenylphosphine, methylphosphine, isobutylphosphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc.

It follows from the above listing that typical substituents for primary alkyl phosphine are lower alkoxy, phenyl, cyano and the like. Typical substituents for primary aryl phosphine, such as phenyl phosphine, are halogen (e.g. Cl, Br, and I) lower alkyl, etc.

In other words, substituents which do not interfere with, enter into, i.e., are inert under the conditions of, the reaction for preparing 4-phosphorinanones are contemplated herein.

Among the divinyl ketones useful for preparing the 4-phosphorinanone reactants of the present invention are:

1,4-hexadien-3-one
1,4-heptadien-3-one
1,4-octadien-3-one
7-methyl-1,4-octadien-3-one
5-methyl-1,4-hexadien-3-one
5-methyl-1,4-heptadien-3-one
5-methyl-1,4-octadien-3-one
5-ethyl-1,4-heptadien-3-one
5-propyl-1,4-octadien-3-one
1-cyclohexylidene-3-buten-2-one
5-phenyl-1,4-hexadien-3-one
5-(2'-methoxyethyl)-1,4-nonadien-3-one
Divinyl ketone
2,5-heptadien-4-one
2-methyl-2,5-heptadien-4-one
2,8-dimethyl-3,6-nonadien-5-one
Phorone or 2,6-dimethyl-2,5-heptadien-4-one
2,7-dimethyl-3,6-octadien-5-one
4,6-dimethyl-3,7-diethyl-3,6-nonadien-5-one
2,4-dipropyl-1,4-pentadien-3-one
3,7-diethyl-3,6-nonadien-5-one
5-methyl-9-ethyl-4,7-tridecadien-6-one
Dibenzalacetone
4,4'-dichlorodibenzalacetone
4,4'-dimethyldibenzalacetone
Dicuminylideneacetone
2-chlorodibenzalacetone
3-chlorodibenzalacetone
4-chlorodibenzalacetone
2,3'-dichlorobenzalacetone
2,4'-dichlorobenzalacetone
3,4'-dichlorobenzalacetone The 4-phosphorinanone reactants of the present invention, produced as above, are converted to the corresponding 4-phosphorinane products according to the following typical reaction:

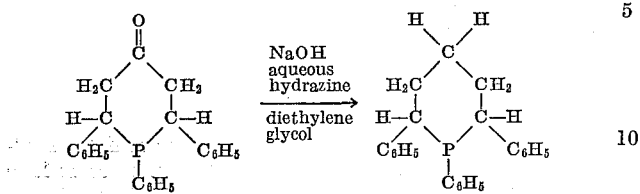

This reaction and a number of other similar conversions will be described hereinafter in greater detail.

Generically, the following equation gives an indication of the scope of the present invention:

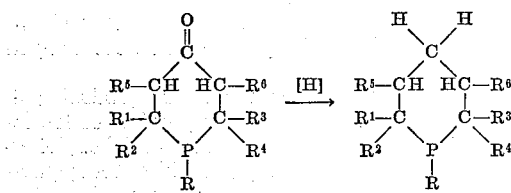

The instant discovery will be understood from the examples given infra. Examples I to XXXII are directed to the preparation of the 4-phosphorinanone reactants and Examples 1 to 21 teach the preparation of the corresponding 4-phosphorinanes:

EXAMPLE I

*2,2,6,6-tetramethyl-1-phenyl-4-phosphorinanone*

A mixture of 7.0 grams (0.051 mole) of 2,6-dimethyl-2,5-heptadien-4-one and 5.6 grams (0.051 mole) of phenylphosphine (transferred with a hypodermic syringe) is heated under nitrogen at 115° C.–130° C. for 6 hours. The solution, still yellow green, crystallizes on cooling. Vacuum distillation gives a total of 9.7 grams of yellowish waxy solid. It is soluble in cold benzene, ether, chloroform, methanol, 2B alcohol, and acetone, soluble in hot acetonitrile, and insoluble in hot hexane and water.

Sublimation of this yellowish waxy solid gives white crystals of 2,2,6,6-tetramethyl-1-phenyl-4-phosphorinanone.

The following table teaches Examples II to XXXII, carried out essentially as Example I, with temperature modifications:

TABLE I

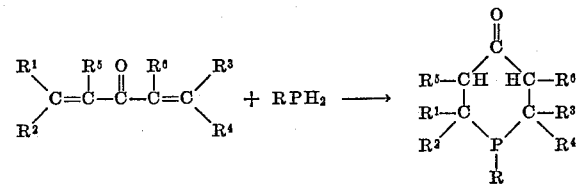

| Example No. | (A) Divinyl Ketone | (B) Primary Phosphine | Temp., °C. | (C) Product |
|---|---|---|---|---|
| II | 1,4-hexadien-3-one | Phenylphosphine | 115 | 2-methyl-1-phenyl-4-phosphorinanone. |
| III | 1,4-heptadien-3-one | Cyclohexylphosphine | 180 | 1-cyclohexyl-2-ethyl-4-phosphinanone. |
| IV | 1,4-octadien-3-one | Isobutylphosphine | 100 | 1-isobutyl-2-propyl-4-phosphorinanone. |
| V | 7-methyl-1,4-octadien-3-one | Methylphosphine | 80 | 2-isobutyl-1-methyl-4-phosphorinanone. |
| VI | 5-methyl-1,4-hexadien-3-one | 2-cyanoethylphosphine | 200 | 1-(2'-cyanoethyl)-2,2-dimethyl-4-phosphorinanone. |
| VII | 5-methyl-1,4-heptadien-3-one | Octylphosphine | 160 | 2-ethyl-2-methyl-1-octyl-4-phosphorinanone. |
| VIII | 5-methyl-1,4-octadien-3-one | Propylphosphine | 90 | 2-methyl-1,2-dipropyl-4-phosphorinanone. |
| IX | 5-ethyl-1,4-heptadien-3-one | Octadecylphosphine | 170 | 2,2-diethyl-1-octadecyl-4-phosphorinanone. |
| X | 5-propyl-1,4-octadien-3-one | Dodecylphosphine | 160 | 1-dodecyl-2,2-dipropyl-4-phosphorinanone. |
| XI | 1-cyclohexylidene-3-buten-2-one | Phenylphosphine | 160 | 1-phenyl-1-phosphaspiro [5.5] undecan-4-one. |
| XII | 5-phenyl-1,4-hexadien-3-one | do | 150 | 2-methyl-1,2-diphenyl-4-phosphorinanone. |
| XIII | 5-(2'-methoxyethyl)-1,4-nonadien-3-one | Octylphosphine | 170 | 2-butyl-2(2'-methoxyethyl)-1-octyl-4-phosphorinanone. |
| XIV | Divinyl ketone | 2-cyanoethylphosphine | 180 | 1-(2'-cyanoethyl)-4-phosphorinanone. |
| XV | 2,5-heptadien-4-one | Pentylphosphine | 110 | 2,6-dimethyl-1-pentyl-4-phosphorinanone. |
| XVI | 2-methyl-2,5-heptadien-4-one | do | 140 | 2,2,6-trimethyl-1-phenyl-4-phosphorinanone. |
| XVII | 2,6-dimethyl-2,5-heptadien-4-one | Heptadecylphosphine | 150 | 1-heptadecyl-2,2,6,6-tetramethyl-4-phosphorinanone. |
| XVIII | 2,8-dimethyl-3,6-nonadien-5-one | Para-chlorophenylphosphine | 175 | 1-parachlorophenyl-2,6-di-isopropyl-4-phosphorinanone. |
| XIX | 4,6-dimethyl-3,7-diethyl-3,6-nonadien-5-one | Phenylphosphine | 150 | 2,2,6,6-tetraethyl-3,5-dimethyl-1-phenyl-4-phosphorinanone. |
| XX | 2,4-dipropyl-1,4-pentadien-3-one | do | 150 | 1-phenyl-3,5-dipropyl-4-phosphorinanone. |
| XXI | 3,7-diethyl-3,6-nonadien-5-one | 2'-ethoxyethylphosphine | 130 | 1-(2'-ethoxyethyl)-2,2,6,6-tetraethyl-4-phosphorinanone. |
| XXII | 5-methyl-9-ethyl-4,7-tridecadien-6-one | Heptadecylphosphine | 150 | 2-ethylpentyl-6-propyl-1-heptadecyl-4-phosphorinanone. |
| XXIII | Dibenzalacetone | Phenylphosphine | 120 | 1,2,6-triphenyl-4-phosphorinanone. |
| XXIV | 4,4'-dichlorodibenzalacetone | Octylphosphine | 160 | 2,6-di(4'-chlorophenyl)-1-octyl-4-phosphorinanone. |
| XXV | 4,4'-dimethyldibenzalacetone | 2-cyanoethylphosphine | 175 | 1-(2'-cyanoethyl)-2,6-di-(4''-methylphenyl)-4-phosphorinanone. |
| XXVI | Dicuminylideneacetone | Propylphosphine | 115 | 1-propyl-2,6-di-isopropyl-phenyl-4-phosphorinanone. |
| XXVII | 2-chlorodibenzalacteone | Cyclohexylphosphine | 120 | 2-chlorophenyl-1-cyclohexyl-6-phenyl-4-phosphorinanone. |
| XXVIII | 3-chlorodibenzalacetone | 2-ethoxyethylphosphine | 110 | 2-(3'-chlorophenyl)-1-(2''-ethoxyethyl)-6-phenyl-4-phosphorinanone. |
| XXIX | 4-chlorodibenzalacetone | Decylphosphine | 170 | 2-(4'-chlorophenyl)-1-decyl-6-phenyl-4-phosphorinanone. |
| XXX | 2,3'-dichlorodibenzalacetone | Phenylphosphine | 150 | 2-(2'-chlorophenyl)-6-(3''-chlorophenyl)-1-phenyl-4-phosphorinanone. |
| XXXI | 2,4'-dichlorodibenzalacetone | 2-butoxyethylphosphine | 115 | 1-(2'-butoxyethyl)-2-(2''-chlorophenyl)-6-(4'''-chlorophenyl)-4-phosphorinanone. |
| XXXII | 3,4'-dichlorodibenzalacetone | Undecylphosphine | 120 | 2-(3'-chlorophenyl)-6-(4''-chlorophenyl)-1-undecyl-4-phosphorinanone. |

The 4-phosphorinanone reactants prepared as above are converted to the products of the present invention as follows:

EXAMPLE 1

1,2,6-triphenylphosphorinane

A mixture of 5.6 grams (0.0163 mole) of 1,2,6-triphenyl-4-phosphorinanone, 3.5 grams (0.093 mole) of 85% aqueous hydrazine, 3.0 grams (0.075 mole) of sodium hydroxide and 50 milliliters of diethylene glycol is refluxed under nitrogen for 2 hours at 168° C. After distilling off 3 milliliters of water, thereby raising the reflux temperature to 197° C., refluxing is continued for 3 hours. The golden solution is cooled, brought to pH 6 with 6 N hydrochloric acid, then extracted with four 75 milliliter portions of benzene. After drying and removal of benzene 6.3 grams of white solid remained, containing some glycol still, but no carbonyl. Recrystallization from 2B alcohol gives white crystals of product 1,2,6-triphenylphosphorinane.

The following table further illustrates the methods and products of the present invention:

or isopropyl alcohol. Reaction is run for about 18 hours at 190° C. to 210° C. under autogenous pressure.

More recent variations in the procedure have featured higher-boiling solvents, such as ethylene glycol, diethylene glycol, triethylene glycol or triethanolamine and permitting the reaction to be run at atmospheric pressure using excess hydrazine hydrate (from 2:1 to 10:1 excess) and sodium metal (up to 40:1 excess). The reaction is run for 25 to 110 hours at 180° C. to 210° C. Octyl alcohol has also been used as a solvent in a reaction carried out at 180° C. to 185° C. for 18 hours.

While the above conditions are suitable for producing the phosphorinanes of the present invention from their corresponding 4-phosphorinanones, the conditions described by Huang-Minlon referred to above, which make possible shorter reaction times, are preferred. The Huang-Minlon process permits also the use of less expensive aqueous hydrazine hydrate and the use of smaller excess of base by distilling off water and excess hydrazine hydrate after forming the hydrazone, and concluding the reaction in 3 hours at 195° C. to 200° C. For example,

TABLE II

| Example No. | 4-phosphorinanone (10 parts) [1] | Hydrazine [2] | Base | Amount of Base | Solvent | Amount of Solvent | Phosphorinane |
|---|---|---|---|---|---|---|---|
| 2 | 2-methyl-1-phenyl-4-phosphorinanone. | 6 | NaOH | 5 | Diethylene glycol. | 100 | 2-methyl-1-phenylphosphorinane. |
| 3 | 1-cyclohexyl-2-ethyl-4-phosphorinanone. | 5 | KOH | 5 | do | 100 | 1-cyclohexyl-2-ethyl-phosphorinane. |
| 4 | 1-isobutyl-2-propyl-4-phosphorinanone. | 8 | Na | 3 | do | 100 | 1-isobutyl-2-propyl-phosphorinane. |
| 5 | 2-isobutyl-1-methyl-4-phosphorinanone. | 6 | NaOH | 4 | do | 100 | 2-isobutyl-1-methyl-phosphorinane. |
| 6 | 2-ethyl-2-methyl-1-octyl-4-phosphorinanone. | 10 | Na | 3 | Triethylene glycol. | 75 | 2-ethyl-2-methyl-1-octylphosphorinane. |
| 7 | 2-methyl-1,2-dipropyl-4-phosphorinanone. | 6 | Na | 3 | Ethylene glycol. | 75 | 2-methyl-1,2-dipropyl-phosphorinane. |
| 8 | 2,2-diethyl-1-octadecyl-4-phosphorinanone. | 7 | NaOH | 6 | do | 75 | 2,2-diethyl-1-octadecyl-phosphorinane. |
| 9 | 1-dodecyl-2,2-dipropyl-4-phosphorinanone. | 6 | NaOH | 8 | do | 75 | 1-dodecyl-2,2-dipropyl-phosphorinane. |
| 10 | 1-phenyl-1-phosphaspiro [5.5] undecan-4-one. | 6 | KOH | 9 | Diethylene glycol. | 100 | 1-phenyl-1-phosphaspiro [5.5] undecane. |
| 11 | 2-methyl-1,2-diphenyl-4-phosphorinanone. | 7 | NaOH | 5 | do | 80 | 2-methyl-1,2-diphenyl-phosphorinane. |
| 12 | 2-butyl-2-(2'-methoxyethyl)-1-octyl-4-phosphorinanone. | 6 | NaOH | 10 | do | 90 | 2-butyl-2-(2'-methoxy-ethyl)-1-octylphosphorinane. |
| 13 | 1-(2'-cyanoethyl)-4-phosphorinanone.[3] | 8 | NaOH | 15 | do | 80 | 1-(2'-carboxyethyl)-phosphorinane.[3] |
| 14 | 2,6-dimethyl-1-pentyl-4-phosphorinanone. | 6 | KOH | 5 | do | 80 | 2,6-dimethyl-1-pentyl-phosphorinane. |
| 15 | 2,2,6-trimethyl-1-phenyl-4-phosphorinanone. | 5 | NaOH | 5 | do | 80 | 2,2,6-trimethyl-1-phenylphosphorinane. |
| 16 | 1-heptadecyl-2,2,6,6-tetramethyl-4-phosphorinanone. | 9 | NaOH | 5 | do | 80 | 1-heptadecyl-2,2,6,6-tetramethyl-phosphorinane. |
| 17 | 2,2,6,6-tetraethyl-3,5-dimethyl-1-phenyl-4-phosphorinanone. | 6 | NaOH | 5 | do | 80 | 2,2,6,6-tetraethyl-3,5-dimethyl-1-phenyl-1-phenylphosphorinane. |
| 18 | 1-phenyl-3,5-dipropyl-4-phosphorinanone. | 6 | NaOH | 5 | do | 80 | 1-phenyl-3,5-dipropylphosphorinanes |
| 19 | 1-(2'-ethoxyethyl)-2,2,6,6-tetraethyl-4-phosphorinanone. | 6 | NaOH | 5 | do | 80 | 1-(2'ethoxyethyl)-2,2,6,6-tetraethyl-phosphorinane. |
| 20 | 1-phenyl-3,5-dipropyl-4-phosphorinanone. | 7 | NaOH | 5 | do | 80 | 1-phenyl-3,5-dipropylphosphorinane. |
| 21 | 1-(2'-cyanoethyl)-2,6-di-(4''-methylphenyl)-4-phosphorinanone.[3] | 8 | NaOH | 10 | do | 80 | 1-(2'-carboxyethyl)-2,6-di-(4''-methylphenyl)-4-phosphorinane.[3] |

[1] All amounts in above Table II are given in parts by weight.
[2] Hydrazine as the 85% hydrazine hydrate.
[3] The cyano substituent in the reactant is converted to a carboxy substituent in the product.

Temperatures:
Examples 2 through 5 are heated 2 hours at 165° C., followed by 3 hours at 195° C.-200° C.
Examples 6 through 9 are heated 1 hour at 160° C., followed by 5 hours at 195° C.
Example 10 is heated 1 hour at 165° C., followed by 3.5 hours at 200° C.
Examples 11 through 21 are heated 2 hours at 165° C., followed by 3 hours at 195° C.

A discussion of the reduction processes contemplated herein is deemed necessary at this point. Originally the Wolff-Kishner [cf. M. D. Soffer, M. B. Soffer and K. W. Sherk, JACS 67, 1435 (1945); C. H. Herr, F. C. Whitmore and R. W. Schiessler, JACS 67, 2061 (1945); and Huang-Minlon, JACS 68, 2487 (1946)], reduction of carbonyl compounds was carried out by alkaline fusion of the dry hydrazone or semicarbazone of the carbonyl compound.

Alternatively, the reaction may be carried out by heating the carbonyl compound in an autoclave with hydrazine hydrate (2:1 excess or more), sodium ethoxide or methoxide (9:1 excess), and absolute ethyl alcohol 85% hydrazine hydrate (3:1 excess), and diethylene glycol are heated with the carbonyl compound (4-phosphorinanone) as described in the above examples.

The products of the present invention are useful for sequestering metal ions, e.g., nickel, cobalt, copper, iron, and the like, from solutions containing same, such as, alcohols, benzene, ether, chloroform, acetone, and the like. The products of the present invention selectively complex these ions in solution.

The phosphorinanes of the present invention also have direct utility as gasoline additives. For example, up to about 10 milliliters of any one of these phosphorinanes, when dissolved in one gallon of gasoline, affords pro-

I claim:
1. A 4-phosphorinane of the formula

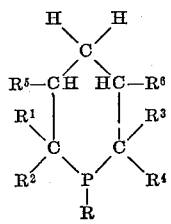

wherein R in the above formula represents a member selected from the group consisting of substituted and unsubstituted, branched and straight chain alkyl (C$_1$–C$_{18}$)

cyclohexyl, and substituted and unsubstituted aryl, said substituents for alkyl being selected from the group consisting of lower alkoxy, phenyl and carboxy, and said substituents for aryl being selected from the group consisting of lower alkyl and halogen; R$^1$, R$^2$, R$^3$ and R$^4$ each represent a member selected from the group consisting of hydrogen, lower alkyl, phenyl, lower alkyl-substituted phenyl, cyclohexyl and lower alkoxyalkyl; and R$^5$ and R$^6$ each represent a member selected from the group consisting of hydrogen, lower alkyl and phenyl; at least one of said R$^1$–R$^4$ moieties being other than hydrogen.

2. 1,2,6-triphenylphosphorinane.
3. 2,2,6,6-tetramethyl-1-octylphosphorinane.
4. 1-isobutyl-2,6-diphenylphosphorinane.
5. 1-cyclohexyl-2,6-diphenylphosphorinane.
6. 1-octyl-2,6-diphenylphosphorinane.
7. 1-isobutyl-2,2,6,6-tetramethylphosphorinane.
8. 2,2,6,6-tetramethyl-1-phenylphosphorinane.
9. 1-cyclohexyl-2,2,6,6-tetramethylphosphorinane.

References Cited by the Examiner
UNITED STATES PATENTS 2,160,915   6/1939   Schreiber _____ 260—606.5 X

OTHER REFERENCES

Kosolapoff: Organophosphorus Compounds, John Wiley & Sons, Inc., New York, 1950, pages 36 to 37.

TOBIAS E. LEVOW, *Primary Examiner.*

LEON D. ROSDOL, *Examiner.*

UNITED STATES PATENT OFFICE
CERTIFICATE OF CORRECTION

Patent No. 3,218,358                                            November 16, 1965

Richard Parke Welcher

It is hereby certified that error appears in the above numbered patent requiring correction and that the said Letters Patent should read as corrected below.

Columns 3 and 4, TABLE I, opposite Example No. XVI, under column B, for "do" read -- phenylphosphine --.

Signed and sealed this 6th day of September 1966.

(SEAL)
Attest:

ERNEST W. SWIDER                                      EDWARD J. BRENNER
Attesting Officer                                                Commissioner of Patents